United States Patent
Noirie et al.

(10) Patent No.: US 7,639,679 B2
(45) Date of Patent: Dec. 29, 2009

(54) PACKET-SWITCHED SYSTEM FOR COMMUNICATION NETWORK NODE

(75) Inventors: Ludovic Noirie, Nozay (FR); Georg Post, La Ville du Bois (FR); Silvio Cucchi, Gaggiano (IT); Fabio Valente, Lonigo (IT)

(73) Assignee: Alcatel, Paris (FR)

( * ) Notice: Subject to any disclaimer, the term of this patent is extended or adjusted under 35 U.S.C. 154(b) by 491 days.

(21) Appl. No.: 11/529,417

(22) Filed: Sep. 29, 2006

(65) Prior Publication Data

US 2007/0115957 A1 May 24, 2007

(30) Foreign Application Priority Data

Sep. 30, 2005 (FR) .................................... 05 52978

(51) Int. Cl.
*H04L 12/50* (2006.01)
(52) U.S. Cl. ..................... 370/388; 370/380; 370/384; 370/373; 370/377; 370/413; 370/414
(58) Field of Classification Search ................ 370/389, 370/392, 395.53, 230, 235, 252, 360, 361, 370/362, 363, 412, 413, 419, 388, 380, 384, 370/373, 377, 414

See application file for complete search history.

(56) References Cited

U.S. PATENT DOCUMENTS

| | | | |
|---|---|---|---|
| 6,633,580 B1 | 10/2003 | Toerudbakken | |
| 2001/0050916 A1 | 12/2001 | Krishna | |
| 2002/0044546 A1 | 4/2002 | Magill | |
| 2003/0021266 A1 | 1/2003 | Oki | |
| 2003/0138253 A1* | 7/2003 | Kim et al. | ........ 398/69 |
| 2007/0127514 A1* | 6/2007 | Post et al. | ........ 370/422 |

* cited by examiner

*Primary Examiner*—Dang T Ton
*Assistant Examiner*—Mandish Randhawa
(74) *Attorney, Agent, or Firm*—Carmen Patti Law Group, LLC

(57) ABSTRACT

To selectively route stand-by packets in input modules to destination output modules via a switching matrix, distributed arbitration functions are executable by successive arbitration cycles. Each cycle comprises: a first phase executable by each input controller to send each output controller requests representative of the quantities of required stand-by packets; a second phase executable by each output controller to determine the quantity of admissible packets depending on the requests; a third phase executable by a central arbitration unit to determine allowed aggregate quantities depending on all the admissible quantities; and a fourth phase executable by each input controller to determine the allowed packet quantities depending on the admissible quantities and of the allowed aggregate quantities.

10 Claims, 3 Drawing Sheets

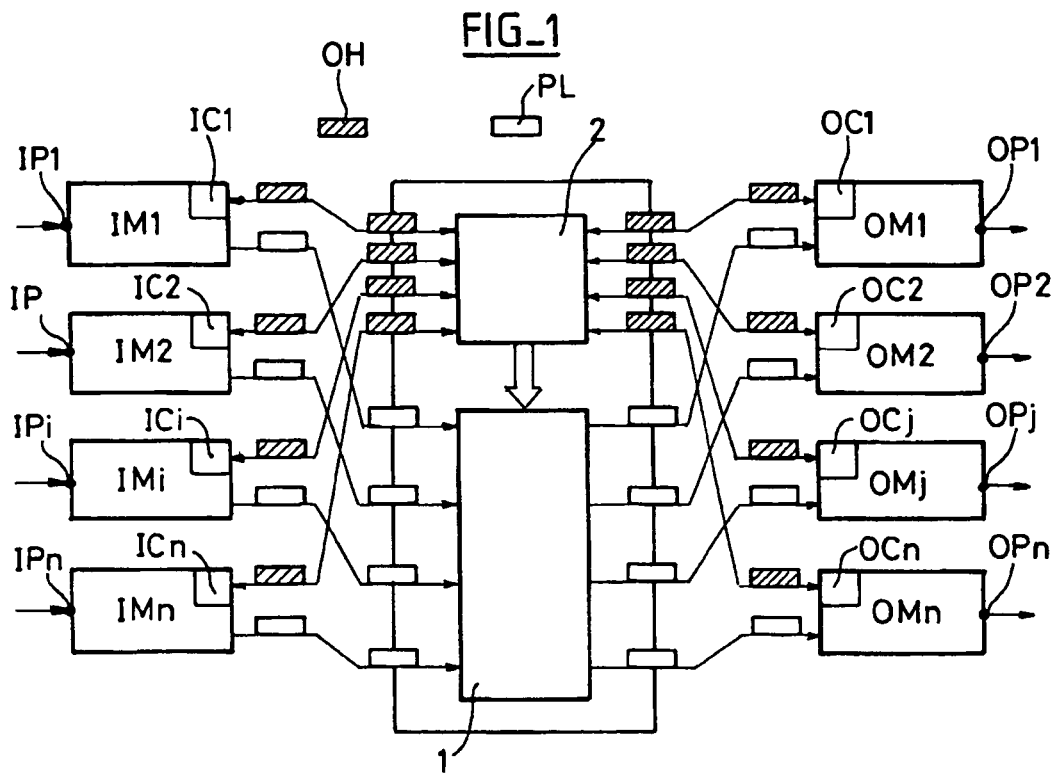
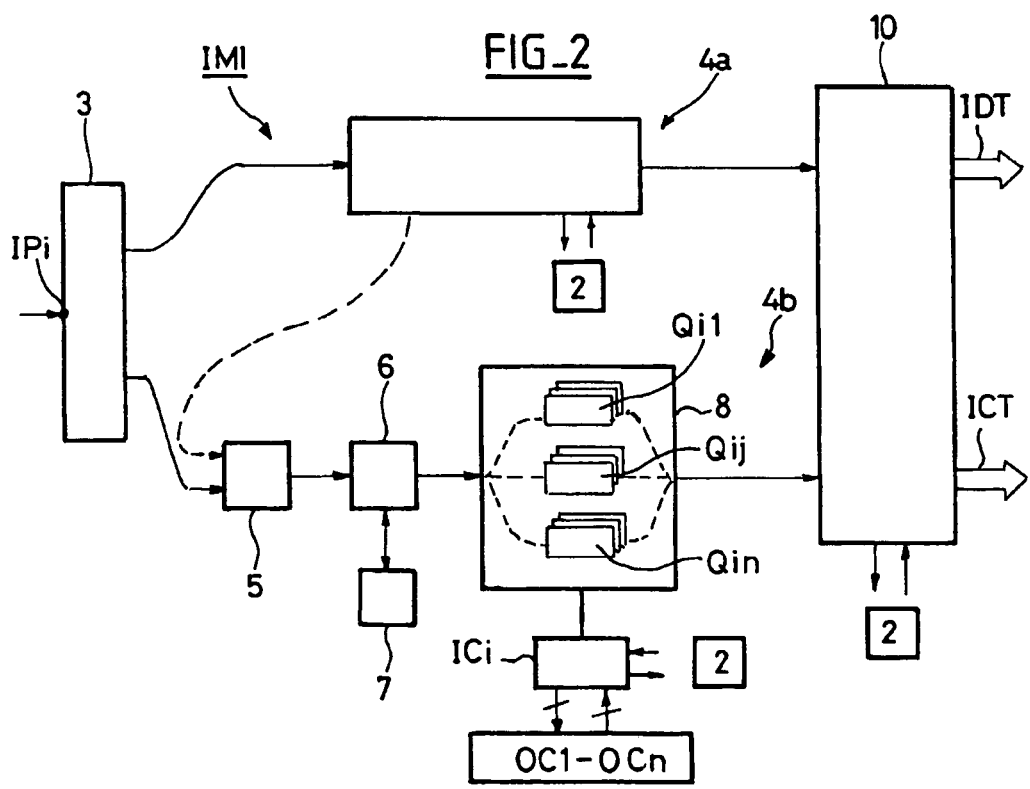

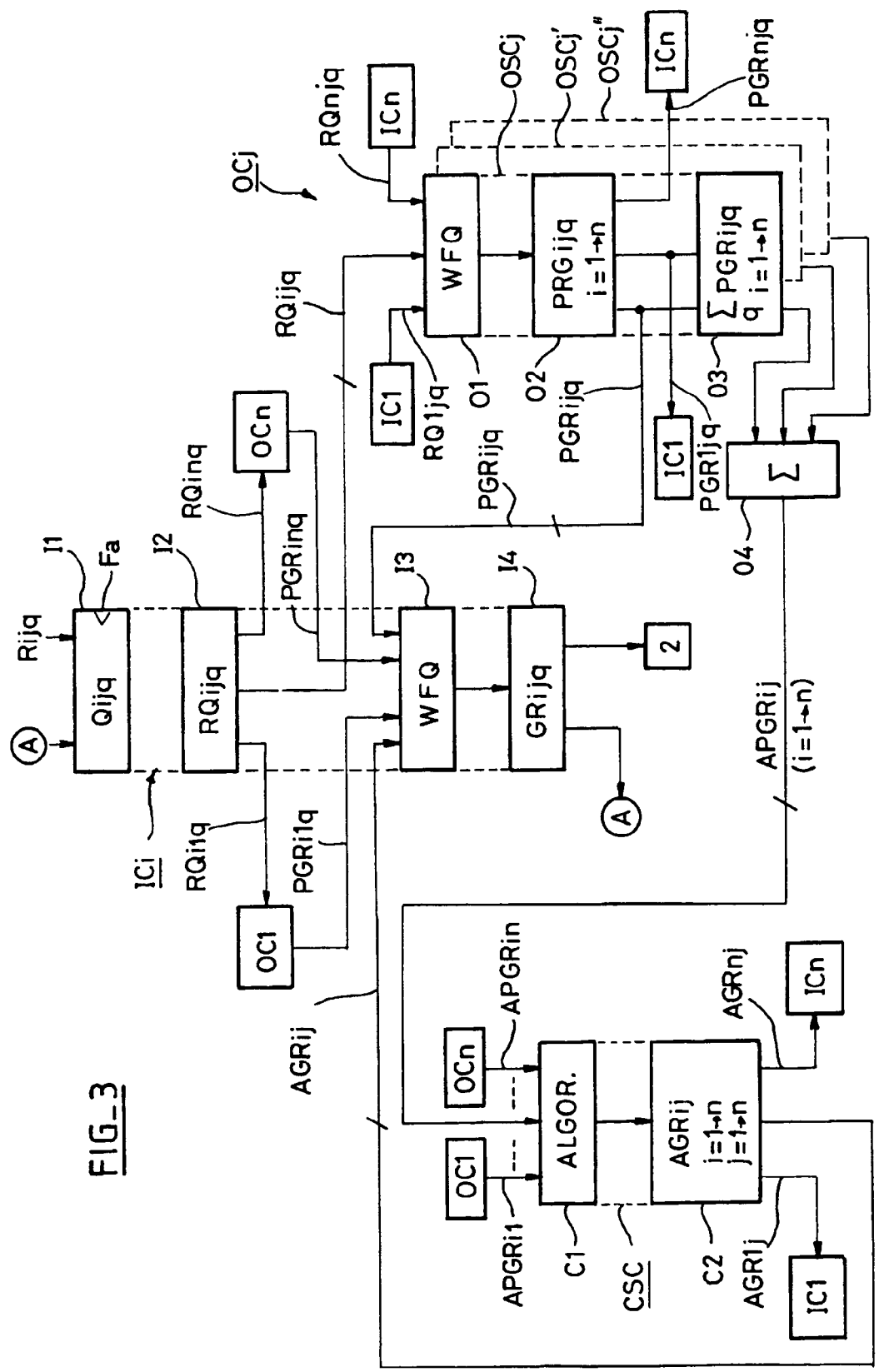
FIG_3

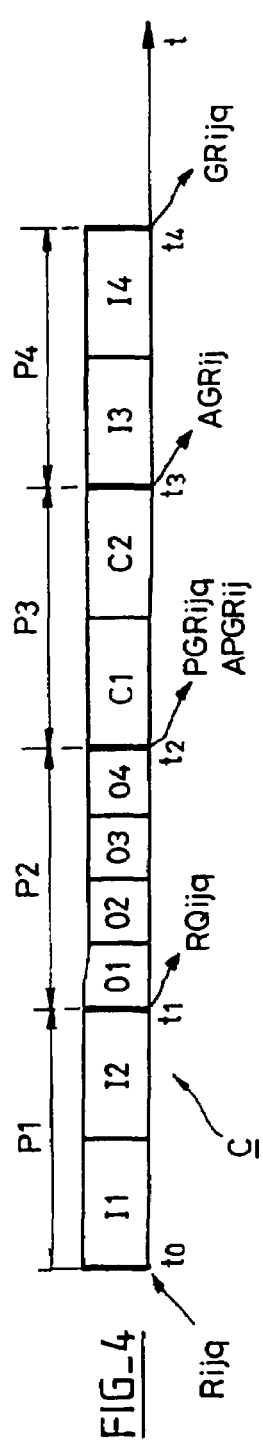
FIG_4
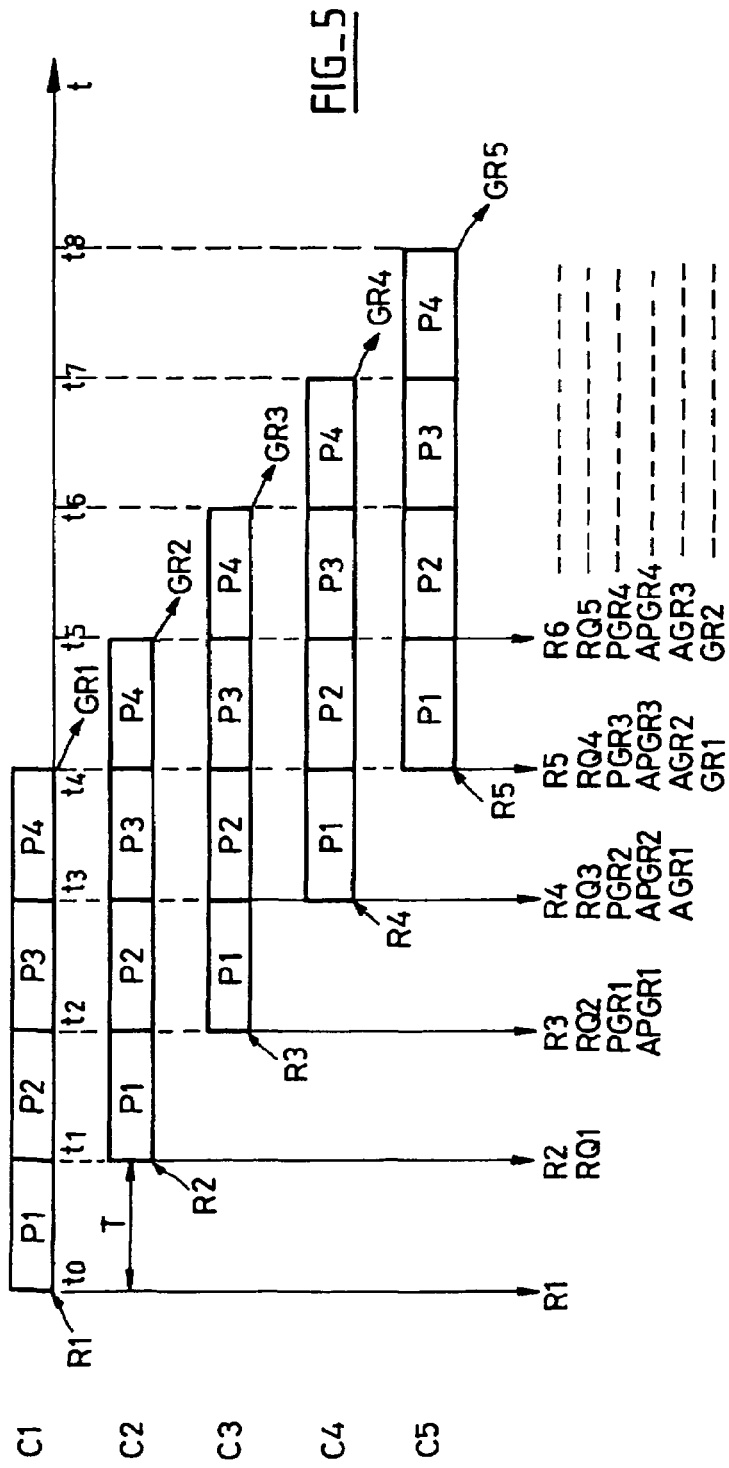
FIG_5

PACKET-SWITCHED SYSTEM FOR COMMUNICATION NETWORK NODE

TECHNICAL FIELD

The invention is related to the field of telecommunication networks and concerns the switching systems used in network nodes.

BACKGROUND

The invention specifically concerns switching systems capable of processing data organised in packets (packet switching). It also concerns the so-called "multiservice" switching systems, i.e., systems that are capable of performing packet switching while also being capable of processing data organised in different transmission formats (circuit switching), typically data organised in time-division multiplexing (TDM) in compliance with the SDH or SONET protocols or even ODU ("Optical Data Unit").

Here the term "packet" refers to any data set grouping transmit data information according to a pre-established format (called "payload") and auxiliary data contained e.g. in a packet header. The header specifically contains an indication of the destination of the packet and generally a service quality class. The indication may be an explicit destination address or a "label" representative of that destination. The most common packet formats include the IP (Internet Protocol), MPLS or Ethernet packets that have a variable size and the ATM cells that have a fixed size.

It should be noted that a network comprises multiple nodes interconnected by transmission links. A node is frequently connected to various other nodes and then integrates routing functions to selectively route data carried by signals received from upstream links to other downstream links depending on the respective destinations of the data. Certain nodes have access functions allowing to introduce data in the network and/or to extract data from the network.

To perform a routing function a node is equipped with a switching system or more simply with a "switch". A switching system comprises multiple input ports connected by upstream links to transmitters of user stations or to other nodes as well as multiple output ports connected by downstream links to receivers of other user stations or other nodes. In general the switching system is intended to route the data flows received by its various input ports selectively depending on their respective destinations to output ports allocated to these destinations.

Conflict management is an essential role of a switching system, i.e. the permanent control of the data routing to ensure that various received data intended for a same output port are directed to that port at different times.

The performance of a system is evaluated on the basis of its bandwidth, i.e. the total bit rate of binary data it is capable of routing on average without data loss.

FIG. 1 gives a schematic representation of a typical switching system structure. This system comprises a switching matrix 1 driven by a central controller 2, a multiplicity of input modules IM1, IM2, IMi, IMn respectively driven by input controllers IC1, IC2, ICi, ICn and a multiplicity of output modules OM1, OM2, OMj, OMn respectively driven by output controllers OC1, OC2, OCi, OCn. The input modules are respectively connected to upstream links via input ports IP1, IP2, IPi, IPn, and the output modules are respectively connected to downstream links via output ports OP1, OP2, OPj, OPn. The input and output modules are also networked with central controller 2 that combines the system's central control functions.

The data to be switched received by input ports IPi are transmitted to the matrix by input modules IMi, and depending on the commands received from central controller 2, the matrix performs a selective routing of these data to output ports OPj via output modules OMj. Each input module IMi or output module OMj also communicates with controller 2 to the exchange signals and control information required for the good execution of the selective routing.

More specifically, each input module IMi acts as a physical interface with the relevant upstream link and comprises devices for memorizing and processing the received data, these devices are designed to temporarily store the data, e.g. in the case of packets by creating and managing packet queues. If various service quality classes (or more simply "service classes") are provided in the network, multiple queues will be provided and will be allocated to these respective classes.

Typically, each input module is intended to create multiple queues organised in addressee output ports as well as in service classes. Thus, each of these queues contains the stand-by packets intended for a given output port and benefits from a given service class. The queues organised in this way are occasionally called VOQ (or "Virtual Output Queue").

The management of the queues consists in permanently filling these queues with the new data received and in extracting from these queues the data authorized for transfer to the matrix.

Data transfers between input modules IMi and switching matrix 1 on the one hand and the transfers between the matrix and output modules OMj on the other hand normally occur in successive switching cycles of a constant duration, designated as "transfer duration". Preferably, the switch shall furthermore be designed in such a way that each input and output module can respectively send and receive a quantity of packets simultaneously with each switching cycle. An input module shall e.g. be provided to create and send with each cycle a data block comprising a packet set, each fixed size block comprising multiple groups of packets respectively associated with the various output modules, each group comprising packets intended for a same output module associated with that group. The size of a group should preferably be modifiable. It can also be subdivided into subgroups associated respectively with multiple channels and/or multiple service classes. A switch of this type is described in greater detail in European Patent Application EP 1549103, published on 29 Jun. 2005.

For the matrix to be able to switch the data transferred in this way, the central controller must specifically know the respective output ports to which these transferred data must be routed by the matrix. This routing information is obtained from the destinations contained in the packet headers and depending on the routing information loaded beforehand in the routing table. The input modules are responsible for elaborating this routing information and for transmitting it to the central controller in addition to the associated packets transferred to the matrix. The controller then considers the routing information associated with the packets in order to be able to route them accordingly.

These control data are usually designated by the term "overhead" and are added to the "useful" information data to be switched called "payload". This aspect is represented in FIG. 1, where the payload and the overhead are symbolised respectively by white rectangles PL and hatched rectangles OH.

Prior to the actual routing operations mentioned above, an essential function of a packet switching system is the mechanism allowing to select during operation at what moments how much data of which queues are authorized to be transferred. This role is usually fulfilled by so-called "schedulers" or "arbiters" intended to perform the selections according to predefined rules.

To identify the data to be selected, the arbiters execute an arbitration algorithm intended to optimize the data transfer according to the selected criteria. Amongst possible other criteria the following conditions must at least be met:

avoid conflicts, as stated above;

authorise the input modules to transfer per cycle quantities of data compatible with the maximum transfer capacities between each input module and the matrix on the one hand and between the matrix and each output module on the other hand.

Moreover, a good arbitration mechanism must also meet the following additional conditions:

make stand-by packet choices with a degree of "equity", i.e. handle all the packets of a same service class in an equivalent manner in terms of average transfer time measured on an as short as possible time frame, whatever the input ports and/or output ports via which they transit, e.g. by taking into account the arrival sequence of the packets to be switched;

allocate differentiated priorities to the packets to be extracted from the queues depending on their respective service classes;

contribute towards optimizing the use of the switch resources, i.e. maximize its bandwidth.

To implement an arbitration mechanism, a centralised realisation can be considered, i.e. provide a hardware and/or software subassembly, hereafter called "arbitration unit" in central controller 2, capable of executing a selected arbitration algorithm. This arbitration unit communicates with the input and/or output modules to receive from the latter all the information required to execute the algorithm and to give them the resulting arbitration decisions.

To this end the input modules each dialogue with the arbitration unit according to the following general diagram. At successive times each input module sends the arbitration units requests informing it of the filling status of its queues. Depending on the requests received from all the input modules, the arbitration unit determines the queues to be transferred to the matrix according to the retained criteria and subsequently informs all the input modules by means of grant messages. Depending on the grant messages it receives each input module updates its queues by performing the corresponding data transfers to the switching matrix.

This centralised realisation, however, presents the inconvenience of being complex and of requiring many exchanges of information, more specifically when the number of input and output ports becomes high. Indeed, the arbitration unit must have processing resources that are sufficiently fast to periodically consider the availability statuses of all the output modules, the statuses of all the queues of all the input modules, and respond by giving the input modules the grant information related to all the queues.

The problem becomes worse if the output modules are each foreseen to manage multiple output channels sharing the same output port.

For instance, a switching system to be currently installed in the optical backbone networks should typically comply with the following technical specifications:

simultaneously process packet and "TDM" traffic;

manage a number of hundreds of channels per output port;

take into account thousands of queues in each input module.

SUMMARY

One of the objectives of the invention is to propose a switching system whose arbitration means have an architecture allowing to relax the technological realization constraints, even for high numbers of input and output ports, and of output channels. To this end a specific architecture is proposed that is both distributed and hierarchised. More specifically, the object of the invention is a switching system for a communication network node, comprising a multiplicity of input modules and a multiplicity of output modules each networked with a switching matrix and with a central controller controlling said matrix, each output module having an associated output port, said system being capable of selectively routing via the matrix and said output modules data packets received by said input modules, depending on their respective destinations, towards their respective destination output ports, each input module comprising an input controller for controlling the means capable of organising the packets received in queues, one or more priority levels being selectively allocated to the packets, each output module comprising an output controller for controlling the transfer of each packet received from the matrix to an output channel allocated to the packet and using the associated output port, characterised by the fact that a so-called "detailed" quantity of packets relating to a given couple of input and output modules being defined as a quantity of constituent data of the packet(s) received by this input module, benefiting from a given priority level and allocated to a given output channel of this output module, a sum of detailed quantities related to a same couple of input and output modules, independently of the priority levels and/or of the output channels defining a so-called "aggregate" quantity relating to that couple, said input, output and central controllers integrate arbitration functions distributed and executable in successive arbitration cycles, each arbitration cycle comprising four successive phases:

a first phase executable by the input controller of each input module to send each output controller requests representative of so-called "required" quantities defined as detailed quantities of stand-by packets in this input module and candidate for being carried by the respective output channel or channels managed by this output controller, a second phase executable by the output controller of each output module to determine depending on said requests the so-called "admissible" quantities of packets defined as detailed packet quantities, at the most equal to respectively the said required quantities, which this output module is capable of passing on during a fixed transfer duration, the aggregate quantities corresponding to these admissible quantities so-called "admissible aggregates", a third phase executable by a central arbitration unit to determine depending on said admissible aggregate quantities relating to all the couples of input and output modules, so-called "allowed aggregate" quantities defined as aggregate quantities of packets, at the most equal with respect to said admissible aggregate quantities, which the matrix is capable of transferring during said transfer duration, a fourth phase executable by the input controller of each input module to determine depending on said admissible quantities and said allowed aggregate quantities relating with respect to the formed couples of this input module and of the output modules, allowed detailed quantities of packets intended for the respective channels of the output modules, at the most equal to the corresponding admissible detailed quantities and determined so that the resulting aggregate quantities do not exceed said corresponding allowed aggregate quantities.

Because of the distribution of the tasks that can be executed in parallel, this solution is well adapted to high-capacity switches without it being necessary to use faster processing tools. Indeed, the operations performed by each output controller remain moderately complex as they take into account detailed information originating from the input modules, without, however, taking into account the results of operations performed by the other output controllers. Similarly, the central arbitration unit presents a complexity that is dependent on the number of input and output modules, but is independent of the number of priority levels and of the number of output channels per output module.

Moreover, as the architecture is modular, it offers the advantage of being easily scalable, i.e. of allowing to adapt the elements of the system to modifications in the number of input and output ports or in the number of output channels per module without too much difficulty.

All these aspects show that the invention proposes a switching system, with a scalable arbitration function whose speed can be made compatible with complex and high-capacity switching systems without being restricted by the possibilities of electronic technologies. This is particularly appreciable for realising the multiservice switching systems mentioned above. Indeed, having a same matrix process TDM type data imposes synchronised operation at a compulsory rhythm on the system, which constitutes an additional constraint for the arbitration function in respect of the straightforward packet switching systems.

According to a first realisation aspect the system is dimensioned to ensure said transfer duration is inferior to the duration of the arbitration cycles, and the start of two consecutive arbitration cycles are temporally separated by this same transfer duration.

Preferably, each phase of the arbitration cycles has a same duration equal to this same transfer duration.

Other objectives, aspects and advantages of the invention will appear further in the description, which includes various realisation modes of the invention given as illustration only and non restrictive, in reference to the figures.

DESCRIPTION OF THE DRAWINGS

FIG. 1 commented above gives a schematic representation of an example of a switching system in which a realisation mode of the invention may be implemented.

FIG. 2 gives a schematic representation of an input module of the switching system.

FIG. 3 is a diagram showing the respective functions of the system controllers in compliance with a realisation mode of the invention.

FIG. 4 represents in the form of a timing diagram the execution phases that form an arbitration cycle in compliance with a realisation mode of the invention.

FIG. 5 represents the sequencing diagram of multiple successive arbitration cycles in the form of timing diagrams in the case of a device in compliance with a realisation mode of the invention operating in pipe-line mode.

DETAILED DESCRIPTION

FIG. 2 represents one of input modules IMi foreseen for a switching system as represented in FIG. 1 and of the "multi-service" type.

In this instance module IMi comprises a first path 4a dedicated to time division multiplexing, the so-called TDM path, and a second path 4b for processing the packets, the so-called packet path. The two paths 4a, 4b are each connected upstream to an input interface circuit 3 and downstream to an output interface circuit 10. It should be noted that it is also possible to have input modules with path 4a only (purely TDM input module) and also input modules with path 4b only (purely packet input module).

Input interface circuit 3 receives signals carried by an upstream link via associated input port IPi. This circuit mainly represents a physical interface with the link, e.g. to realise a possible conversion in the form of received electrical signals, for their formatting and conversion into digital format. Circuit 3 also integrates a routing function to the TDM path or the packet path depending on the network management command that determines the foreseen format type, TDM or packets, of the received data.

The TDM path mainly consists of a classical type TDM processor intended to perform time demultiplexing operations and data transfers to matrix 1 in response to dialogues exchanged with central controller 2.

The packet path successively comprises a packet reformatting stage 5, a classification stage 6 and a queue memory 8. All of which are driven by input controller ICi.

Classification stage 6 takes into account the destination indications and the service quality classes contained in the packet headers. Stage 6 cooperates with a routing table 7 to determine the output modules and ports to which the received packets must be routed depending on these destination indications and routing information loaded beforehand in table 7. If applicable, if multiple channels have been provided per output port, it also determines the respective channels allocated to the transport of these packets. The channels may be "physical" channels materialised by e.g. multiple transmitters connected to separate physical links. They may also be time and/or spectral channels sharing a common physical link.

Depending on these elements and under the control of a queue management unit of input controller ICi, queues of packets are created in memory 8. In practice, a queue shall consist of packets of a same service quality class and intended for a same output port, and for a same output channel if multiple channels are provided per output port.

Hereafter to designate the object treated we will use the following notations: index i identifies one of input modules IMi, index j identifies one of output modules OMj or corresponding output port OPj, index q identifies one of the priority levels assignable to the packets, e.g. in relation to the various service classes foreseen in the network. Depending on the case, it is possible to add other indexes, such as index k identifying one of the channels managed by output module OMj. Hereafter, for reasons of simplification, the index of channel k shall usually be omitted, it being understood that all the affected objects of the three indexes i, j, q will always implicitly concern a same output channel.

Thus, in an input module IMi, a corresponding queue $Q_{ijqc}$ will be defined for the stand-by packets with a priority level q and intended to be carried by a channel c of output port OPj of output module OMj. To simplify, the figure only contains references Qi1, Qij, Qin that designate respectively distinct sets of queues formed by all the packets received by input module IMi and intended respectively for output modules OM1, OMj, OMn.

The management unit of input controller ICi updates the queues depending on the new packets received and also depending on the transfer grants for stand-by packets to the matrix.

These grants result from an arbitration mechanism, which will be described in detail once some definitions have been given that will help make it understandable.

A "detailed" quantity of packets relating to an input module has already been defined as a quantity of constituent data of a set of packets received by that input module, benefiting from a given priority level and allocated to a same output channel of a given output module. This quantity may e.g. be a number of octets or of binary words or of cells or of packets, if the latter are of a fixed size.

A "request" is representative of such a detailed quantity of stand-by packets which an input module is ready to transfer and which will be designated as a "required" quantity of packets. Thus, a request RQijq is representative of a required quantity, also noted as RQijq, that will be a detailed quantity of stand-by packets in input module IMi, candidate for being carried by a same channel managed by output controller OCj of output module OMj, and benefiting from priority level q. If multiple channels are managed, a request concerning the stand-by packets intended to be carried by channel k, could be designated more precisely by RQijqk. To simplify the exposition, the index of channel k will be omitted.

A so-called "aggregate" quantity of packets is generally defined as the sum of multiple detailed quantities relating to a given couple of input and output modules IMi-OMj, for all priority levels q and for all output channels managed by output module OMj of the couple.

An "admissible detailed" quantity (or more simply "admissible" quantity) of packets, noted PGRijq, is defined for a given output module OMj as a detailed quantity of packets related to a given input module IMi, in compliance with the above definition (i.e. stand-by in this input module IMi, intended for this output module OMj, benefiting from a given priority level q, allocated to a same output channel), and which this output module OMj is capable of passing through concurrently with other admissible quantities relating to other input modules, for the same output channel, and for a same fixed transfer duration T of a same switching cycle.

An "admissible aggregate" quantity of packets, noted APGRij, relating to a given couple of input and output modules IMi-OMj is defined as the sum of all these "admissible" quantities for this couple, for all priority levels q and for all the output channels managed by the controller of output module OMj of the couple.

A "detailed allowed" quantity (or more simply "allowed" quantity) of packets relating to a given input module IMi, noted GRijq, is defined as a detailed quantity of packets that input controller ICi of this input module is allowed to transfer during a same transfer duration T of a same switching cycle.

An "allowed aggregate" quantity of packets for an input module IMi and relating to a couple formed by this input module and a given output module OMj, noted AGRij, is defined as an aggregate quantity of packets that input controller ICi of this input module is allowed to transfer during a same transfer duration T of a same switching cycle, concurrently with other allowed aggregate quantities relating to other couples formed by this input module and the other output modules.

The diagram in FIG. 3 allows to describe the respective arbitration roles of input and output controllers ICi, OCj and of the central arbitration unit CSC of the system.

FIG. 3 specifically illustrates the operations concerning the packets received by input module IMi, benefiting from priority level q and intended for a specific output channel (non-referenced) of an output port managed by the output module OMj.

The arbitration operations are performed cyclically at a given rhythm. In principle, this rhythm has a constant frequency Fa, however, if required, it could follow other rules. It should be noted that the duration of the arbitration cycles is not controlled by the switching cycle period, i.e. transfer duration T mentioned above. The arbitration cycles may have durations that are multiples of the transfer duration as will be shown below.

As schematically represented in the diagram, an arbitration cycle is initialised by the input controllers in A. It starts in each input module IMi with an update of each queue (stage I1). Size Qijq of the queue is thus updated based on its initial size and depending on the quantity of new Rijq packets received during the previous cycle and relating to this queue, and of the quantity of packets allowed to be switched during the previous cycle (i.e. the allowed detailed quantity of packets).

Input controller ICi then prepares for each queue an associated request RQijq representative of the detailed quantity of stand-by packets RQijq candidate for being carried by the output channel corresponding to this queue (stage I2).

All these requests RQi1$q$, RQijq, RQinq are then sent to their relevant respective output controllers OC1, OCj, OCn.

If multiple output channels are provided per output port, input controller ICi will then specifically send to output controller OCj a request RQijq for each priority level q and for each output channel managed by this output controller.

Output controller OCj then receives from all input controllers IC1, ICi, ICn all their respective requests RQ1$jq$, RQijq, RQnjq.

If there are multiple output channels per output port, the output arbitration function should preferably be subdivided into multiple independent arbitration units respectively dedicated to the channels. These units OSCj, OSCj', OSCj" can perform in parallel the operations relating to the respective channels, thus allowing a processing time that is independent of the number of channels.

FIG. 3 details the operations performed by one of them OSCj. After receiving requests RQijq concerning the associated channel, output arbitration unit OSCj implements a choice algorithm (stage O1) that determines corresponding admissible detailed quantities PGRijq in response to requests RQijq, among the candidate packet quantities that are stand-by in the various input modules IMi.

These admissible detailed quantities are determined to at least meet the following requirement: the output module must be capable of passing during transfer duration T via each output channel the total number, calculated for all input modules, of admissible detailed quantities of packets candidate for being carried by that same channel. In practice, this condition restricts the sum of all the admissible detailed quantities relating to any given output channel to a maximum transfer capacity allowed by this channel.

In the event all the received requests RQijq result in the totality of the detailed quantities of packets candidate for a same output channel exceeding its maximum capacity, the algorithm would intervene to select lower quantities. Preferably, the algorithm is chosen to apply an equity rule intended to grant packets with a same priority level q a same average processing priority, whatever the input module IMi in which the packets are stand-by. Moreover, the algorithm obviously takes into account priority levels q by fixing admissible detailed quantities that are proportionally greater as the priority level becomes higher.

To this end a classical type algorithm may be used such as the so-called "WFQ" ("Weighted Fair Queuing") algorithm.

Once calculated these admissible detailed quantities PGR1jq, PGRijq, PGRnjq are sent to the various respectively concerned input controllers IC1, ICi, ICn (stage O2).

The same operations are performed in parallel by all the output arbitration units of all the output controllers. Consequently, e.g. input controller ICi will receive from the various output controllers OC1, OCj, OCn all the relevant admissible detailed quantities PGRi1q PGRijq PGRinq (stage I3).

For each input module IMi the sum of all the admissible quantities for all priority levels q (stage O3) and for all output channels managed by the output module (stage O4) is also calculated by each output controller OCj. In this way admissible aggregate quantities of packets APGRij are obtained, for the n couples formed by the relevant output module OMj and n input modules IM1, IMi, IMn.

These values APGRij, for i=1 to n are then sent to the central arbitration unit CSC. The latter thus receives in parallel the values of the admissible aggregate quantities of packets APGRij, for j=1 to n, calculated by all the output controllers OC1, OCj, OCn.

As a variant, the operations of stages O3 and O4 could also be performed by the central arbitration unit, or even in another dedicated unit. Obviously, the admissible quantities calculated by each output controller OCj should then be sent to the central arbitration unit (or to the dedicated unit) to allow the latter to calculate the corresponding admissible aggregate quantities.

The central arbitration unit CSC then performs a choice algorithm (stage C1) to determine depending on all the received values APGRij, for i=1 to n and j=1 to n, the corresponding "allowed" aggregate quantities of packets AGRij. The latter are aggregate quantities of packets, at the most equal with respect to the admissible aggregate quantities, that matrix 1 is capable of transferring during transfer duration T of a same switching cycle.

Preferably, the choice algorithm determines allowed aggregate quantities AGRij by applying an equity rule aimed at granting the relevant candidate packets a same average processing priority whatever the relevant destination output port OP1, OPj, OPn.

The algorithm could e.g. be defined in the following manner.

By defining an "input capacity" as a maximum quantity of data capable of being transferred between an input module IMi and matrix 1 during transfer duration T, the central arbitration function determines the allowed aggregate quantities by multiplying each admissible aggregate quantity APGRij by a proportionality factor with value 1 if the sum of all the admissible aggregate quantities APGRij relating to this input module IMi is inferior or equal to the input capacity, and otherwise, more or less takes a value K so that the product of this value K by the sum of the admissible aggregate quantities APGRij is equal to the input capacity.

For a given admissible aggregate quantity APGRij, the proportionality factor to be applied shall be chosen close to value K and in such a way that its product by the associated admissible aggregate quantity APGRij is a whole number, taking account of the fact that the data quantities are themselves whole numbers of octets or of binary words or of cells. It should be noted that proportionality factors inferior to K applied to certain admissible aggregate quantities may be compensated by proportionality factors that are superior to K applied to other admissible aggregate quantities so that the sum of the allowed aggregate quantities is as close as possible to the input capacity without actually exceeding it.

The allowed aggregate quantities AGRij thus calculated, for i=1 to n and j=1 to n, are then transmitted to the various relevant input controllers IC1, ICi, ICn (stage C2).

Each input controller, such as ICi, thus has allowed aggregate quantities AGRij relating to the n formed couples of relevant input module IMi, and of the n output modules OM1, OMj, OMn. It also has detailed admissible quantities PGRijq relating to the same couples, for all priority levels and all output channels. Depending on these data the input controller then determines the allowed detailed quantities GRijq of packets (stage I3).

The determination of the allowed detailed quantities GRijq represents the end of an arbitration cycle (stage I4) and the process can proceed by returning to starting point A of stage I1 for the next cycle. Operation in pipe-line mode is also possible. It will be described below in FIGS. 4 and 5.

The allowed detailed quantities GRijq are determined so as to ensure the resulting aggregate quantities do not exceed allowed aggregate quantities AGRij and remain as equal as possible to the corresponding admissible detailed quantities PGRijq.

These allowed detailed quantities are calculated e.g. by simply applying a proportionality rule between allowed detailed quantities GRijq and admissible detailed quantities PGRijq, with identical or at least close coefficients allowing to ensure the sum of all allowed detailed quantities GRijq relating to any formed couple of this input module IMi and any output module OMj, does not exceed the corresponding allowed aggregate quantities AGRij. Optionally, instead a choice algorithm could be used applying an equity rule of the above-mentioned type "WFQ".

The allowed detailed quantities GRijq thus determined allow to define the sizes of the corresponding data packet subgroups and thus form data groups and blocks ready to be transferred to the matrix. The transfer of a block occurs during transfer duration T of a same switching cycle and the transfer of all data whose quantities are defined by an arbitration cycle can occur during the execution of the following arbitration cycle.

FIGS. 4 and 5 will allow to explain in greater detail various possible operating modes of the arbitration mechanism.

FIG. 4 is a representation in the form of a timing diagram of the various stages described above and which thus constitute a complete arbitration cycle specifically involving input module IMi and a particular channel of output module OMj for data of a specific service class q.

Moreover, the stages were regrouped in order to make four main execution phases P1 through P4 of the arbitration cycle stand out:

phase P1 regroups stages I1 and I2 carried out by input controller ICi, phase P2 regroups stages O1 to O4 carried out by output controller OCj, phase P3 regroups stages C1 and C2 carried out by central arbitration unit CSC, phase P4 regroups stages I3 and I4 carried out by input controller IMj.

Thus, first phase P1 of the arbitration cycle starts at time t0 with each input controller ICi processing the new packets received and not yet processed by any previous arbitration cycle. For couple IMi-OMj, these new packets then correspond to detailed quantities noted Rijq.

Phase P1 ends when input controller ICi sends each output controller OCj a request representative of the detailed quantity of packets RQijq in stand-by and candidates for being switched.

Second phase P2 starts at time t1 with output controller OCj processing each request that concerns it, it proceeds with the sending to each input controller ICi of the calculated admissible quantities PGRijq and ends with the sending to the central arbitration unit CSC of the corresponding admissible aggregate quantities APGRij.

Third phase P3 starts at time t2 with central arbitration unit CSC processing all the admissible aggregate quantities APGRij relating to all the couples of input and output controllers, and ends with the sending to each input controller, more specifically ICi, of the calculated allowed aggregate quantities AGRij that concern it.

Fourth phase P4 starts at time t3 with input controller ICi processing allowed aggregate quantities AGRij and ends with the calculation of allowed detailed quantities GRijq whose result becomes available at time t4.

According to a first option, the system could be designed in such a way that the arbitration cycles succeed one another, a cycle starting only after the complete run of the four constituent phases of the previous cycle. In this case, the cycle that succeeds the cycle represented in FIG. 4 will start at the earliest at time t4 and the operations performed according to the four phases P1 through P4 described above will be repeated.

This operating mode presents the characteristic that at the start of each arbitration cycle, the sizes of queues Qijq at that time can be determined simply by subtracting from the sizes of the queues at the start of the previous arbitration cycle corresponding allowed quantities GRijq and by adding the quantities of the new received packets Rijq during the duration of this previous arbitration cycle.

To facilitate the further explanations, we will designate the various quantities of packets involved by means of a simplified notation that introduces cycle number index c and suppresses indexes ijq considered as implicit. Thus "required quantity" RQc in cycle c is equal to the effective size at the start of associated queue cycle Qc. For a cycle c and by calling Rc the quantity of "new" packets (i.e. all those that have been received but have not yet been processed by the previous cycles), the size of the queue is the sum of Rc and of the cumulative total of differences Rx−GRx for x=1 to c−1. Thus:

$RQc = Rc + \Sigma(Rx - GRx)$, x=1 to c−1.

This operating mode imposes on the data whose quantities are calculated by an arbitration cycle a transfer duration T that is at least as long as the duration of the arbitration cycle, even if the specific circuits that realise the transfer could allow an actual transfer during a lower duration.

However, as the arbitration functions are distributed and are hence executable by processing means capable of operating in parallel it is possible to design the system in such a way that transfer duration T is lower than the duration of the arbitration cycles by providing an operation of the pipeline type. The start of two consecutive arbitration cycles will then be temporally separated by this transfer duration T. This will allow the switching system to operate at a greater speed.

Obviously, it will be necessary to adjust duration T and/or those of phases P1 to P4 to ensure that at each moment the simultaneously running arbitration cycles use different processing resources.

A particular case, which allows the shortest transfer duration T in respect of that of the arbitration cycles is that in which the system is dimensioned so that each of phases P1 to P4 has a same duration equal to transfer duration T.

This last option is illustrated by the timing diagram in FIG. 5 representing five consecutive arbitration cycles c1 to c5. First cycle c1 starts at time t0 and times t1, t2, t3, t4 correspond to the respective ends of phases P1, P2, P3, P4 of this first cycle c1. Times t1, t2, t3, t4 also correspond with respect to the start of the following cycles c2, c3, c4, c5, the start of two consecutive cycles being temporally offset from T.

The figure also shows, with simplified notations, the various detailed Rx, RQx, PGRx, GRx and aggregate APGRx, AGRx packet quantities for x=1 to 5, available at times t1, t2, t3, t4, t5 and respectively relating to successive cycles c1 to c5.

You will notice that an allowed quantity, e.g. GR1 calculated by first cycle c1 and available at time t4, cannot be processed by the three following cycles c2 to c4 but only by cycle c5 (or a later cycle). However, the quantities of new packets R1-R5 received during the consecutive corresponding transfer durations T may be processed by each cycle.

But difference RQ1−GR1, available at time t4, represents a "required but not allowed" quantity that must be processed as a "partial" required quantity of a subsequent cycle.

Yet we also note that at time t2 the output controller has at its disposal admissible detailed quantity PGR1 and the corresponding required detailed quantity RQ1 relating to the first cycle c1 (available from time t1). However, difference RQ1−PGR1 is a "required but not admissible quantity" and in fact represents a lower limit of required but not allowed quantity RQ1−GR1. Difference RQ1−PGR1 may also be considered as a part of partial required quantity RQ1−GR1 to be processed at a later stage, but its value is available at time t2. Thus difference RQ1−PGR1 may be processed as the partial required quantity by second cycle c2. In this case only "residual" required quantity PGR1−GR1 will remain to be processed as from time t4.

This cumulative process may then be applied for each cycle.

Thus, each quantity required for a cycle c will be equal to the sum of the corresponding required but non admissible quantity calculated during previous cycle RQ(c−1)−PGR(c−1) and of a so-called "complementary" required quantity constituted by:

quantity Rc of the new packets received during the time interval of durations T that separate the start of cycles c−1 and c, the residual required quantity calculated during cycle c−4: PGR(c−4)−GR(c−4).

Such complementary required quantities may be calculated by the input controller and constitute the information carried by the requests respectively transmitted to the relevant output controllers.

Thus this anticipation mechanism may be formulated as follows: if during a given cycle, for a given output channel and a given priority level, admissible quantity PGRijq is inferior to the corresponding required quantity RQijq, their difference is stored by output controller OCj as a non admissible required quantity to be added to a corresponding complementary required quantity to form the required quantity to be processed during the next cycle, this complementary required quantity being received from input controller ICi by means of a request sent with the next cycle.

An analogous anticipation mechanism may be provided for admissible quantities and for allowed quantities by transposing the above reasoning that concerned the required quantities and admissible quantities with respect to the admissible quantities and allowed quantities, and similarly with respect to the admissible aggregate quantities and to the allowed aggregate quantities.

Thus this second anticipation mechanism may be formulated as follows: if during a given cycle, for a given couple of input and output modules IMi, OMj, an allowed aggregate quantity AGRij is lower than the corresponding admissible aggregate quantity APGRij, their difference is stored in the central arbitration unit CSC as non-allowed admissible aggregate quantity to be added to a corresponding complementary admissible aggregate quantity to form the admissible aggregate quantity to be processed during the next cycle, this complementary admissible aggregate quantity being calculated for this couple during the next cycle, and if during a given cycle, for a given output channel of the output module of this couple and a given priority level, allowed quantity GRijq is lower than the corresponding admissible quantity PGRijq, their difference is stored by input controller ICi as the non-allowed admissible quantity to be added to a corresponding complementary admissible quantity to form the admissible quantity to be processed during the next cycle, this complementary admissible quantity being calculated for this couple during the next cycle.

This second anticipation mechanism could be implemented on its own, independently of the first or in combination with it. Depending on the case, a definition of the above-mentioned residual required quantity must be given that takes into account the anticipation mechanisms used.

In the event only the second mechanism is used, the residual required quantity must correspond to a required but non-admissible quantity RQ−PGR. Thus, we can show that complementary required quantity mentioned above relating to cycle c shall comprise:

quantity Rc of new packets received during the time interval of duration T that separates the start of cycles c−1 and c, the residual required quantity calculated during cycle c−3: RQ(c−3)−PGR(c−3).

However, the simultaneous implementation of the two anticipation mechanisms is to be preferred. In this case, there is no residual required quantity and the complementary required quantity will be limited to quantity Rc of new packets received during the time interval of duration T that separates the start of cycles c−1 and c.

The advantage of these measures is that there is no need to send a request for the same packets in the event of negative authorisations (based on the required but non admissible and/or non allowed quantities, and this prevents an additional delay during the transmission of these packets, as a single complete transmission, reception and request processing cycle, and subsequent transmission, reception and authorization processing involves four successive phases as the relevant packets are only sent at the end of this complete cycle, and only in the event of a positive authorisation. Therefore, in the event of an authorisation during the first cycle (based on the quantities required and allowed during the same cycle), the packets are only sent at the end of four phases. In the event of a rejection and acceptance during the next cycle, if e.g. difference PGRijq−GRijq is not reserved for the next cycle, you must wait for the execution duration of 8 phases, whereas if this difference is reserved for the next cycle, you only need wait for the execution duration of 5 phases. The difference is even more important in the event of multiple successive rejections.

The invention claimed is:

1. A switching system for a communication network node comprising:
   a multiplicity of input modules and a multiplicity of output modules each networked with a switching matrix and with a central controller controlling said matrix, each output module having an associated output port, said system being capable of selectively routing via the matrix and said output modules data packets received by said input modules, depending on their respective destinations, towards their respective destination output ports,
   each input module comprising an input controller for controlling the means capable of organising the packets received per queue, one or more priority levels being selectively allocated to the packets,
   each output module comprising an output controller for controlling the transfer of each packet received from the matrix to an output channel allocated to the packet and using the associated output port,
   a detailed quantity of packets relating to a given couple of input and output modules is defined as a quantity of data constituting a packet or several packets received by this input module, benefiting from a given priority level and allocated to a given output channel of this output module,
   a sum of detailed quantities relating to a same couple of input and output modules, independently of the priority levels and/or of the output channels defines an aggregate quantity relating to that couple,
   said input, output and central controllers integrate arbitration functions distributed and executable in successive arbitration cycles, each arbitration cycle comprising four successive phases:
   a first phase executable by the input controller of each input module to send each output controller requests representative of the required quantities defined as detailed quantities of stand-by packets in this input module and candidate for being carried by the respective channel or channels managed by this output controller,
   a second phase executable by the output controller of each output module to determine depending on said requests the admissible quantities of packets defined as detailed packet quantities, at the most equal to respectively the said required quantities, which this output module is capable of passing on during a fixed transfer duration, the aggregate quantities corresponding to these admissible quantities being admissible aggregate,
   a third phase executable by a central arbitration unit to determine depending on said admissible aggregate quantities relating to all the couples of input and output modules, allowed aggregate quantities defined as aggregate quantities of packets, at the most equal with respect to said admissible aggregate quantities, which the matrix is capable of transferring during said transfer duration,
   a fourth phase executable by the input controller of each input module to determine depending on said admissible quantities and said allowed aggregate quantities relating to the formed couples of this input module and of the output modules, allowed detailed quantities of packets intended for the respective channels of the output modules, at the most equal to the corresponding admissible detailed quantities and determined so that the resulting aggregate quantities do not exceed said corresponding allowed aggregate quantities.

2. The switching system of claim 1, wherein said switching system is dimensioned so that said transfer duration is inferior to the duration of said arbitration cycles, and wherein the start of two consecutive arbitration cycles is temporally separated by said transfer duration.

3. The switching system of claim 2, wherein each phase of said arbitration cycles has a same duration equal to said transfer duration.

4. The switching system of claim 2, wherein if during a given cycle, for a given output channel and a given priority level, an admissible quantity is lower than the corresponding required quantity, their difference is stored by the output controller as a non admissible required quantity to be added to a complementary required quantity to form the required quantity to be processed during the next cycle, this complementary required quantity being received from the input controller by means of a request sent during the next cycle.

5. The switching system of claim 2, wherein if during a given cycle, for a given couple of input and output modules, said allowed aggregate quantity is lower than the corresponding admissible aggregate quantity, their difference is stored by the central arbitration unit as non-allowed admissible aggregate quantity to be added to a corresponding complementary admissible aggregate quantity to form the admissible aggregate quantity to be processed during the next cycle, this complementary admissible aggregate quantity being calculated for this couple during the next cycle, and wherein if during a given cycle, for a given output channel of the output module of this couple and a given priority level, an allowed quantity is lower than the corresponding admissible quantity, their difference is stored by the input controller as non-allowed admissible quantity to be added to a corresponding complementary admissible quantity to form the admissible quantity to be processed during the next cycle, this complementary admissible quantity being calculated for this couple during the next cycle.

6. The switching system of claim 1, wherein the execution in each output controller of said second phase implements an output arbitration function that determines with each arbitration cycle among said required packet quantities having a same priority level and intended for a same output channel, said admissible detailed quantities by applying a first equity rule intended to grant these packets a same average processing priority, whatever the input module in which they are stand-by.

7. The switching system of claim 6, wherein said output controller is capable of managing multiple output channels, said output arbitration function being realised by means of multiple output arbitration units respectively dedicated to said channels.

8. The switching system of claim 7, wherein each output arbitration unit implements a choice algorithm of type Weighted Fair Queuing (WFQ).

9. The switching system of claim 1, wherein the execution of said third phase in the central arbitration unit implements a central arbitration function that determines said allowed aggregate quantities by applying a second equity rule intended to grant the relevant candidate packets the same average processing priority whatever the considered destination output port.

10. The switching system of claim 9, comprising an input capacity being defined as a maximum quantity of data capable of being transferred between an input module and the matrix during said transfer duration, said central arbitration function determining said allowed aggregate quantities by multiplying each admissible aggregate quantity by a proportionality factor of value 1 if the sum of all the admissible aggregate quantities relating to this input module is inferior or equal to said input capacity, and in the opposite case, that more or less takes a value K such that the product of this value K by said sum of admissible aggregate quantities is close to or at the most equal to said input capacity.

\* \* \* \* \*

UNITED STATES PATENT AND TRADEMARK OFFICE
CERTIFICATE OF CORRECTION

PATENT NO.        : 7,639,679 B2                                                  Page 1 of 1
APPLICATION NO. : 11/529417
DATED             : December 29, 2009
INVENTOR(S)       : Noirie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 582 days.

Signed and Sealed this

Twenty-first Day of December, 2010

David J. Kappos
*Director of the United States Patent and Trademark Office*